United States Patent
Holden et al.

(10) Patent No.: US 10,641,646 B2
(45) Date of Patent: May 5, 2020

(54) METHOD AND SYSTEM FOR MONITORING THE MASS OF AN OBJECT

(71) Applicant: THE SECRETARY OF STATE FOR DEFENCE, Salisbury, Wiltshire (GB)

(72) Inventors: Simon John Holden, Salisbury (GB); Joseph Henry Spencer, Salisbury (GB); George Winstone, Salisbury (GB)

(73) Assignee: The Secretary of State for Defence, Salisbury, Wiltshire (GB)

( * ) Notice: Subject to any disclaimer, the term of this patent is extended or adjusted under 35 U.S.C. 154(b) by 116 days.

(21) Appl. No.: 15/834,218

(22) Filed: Dec. 7, 2017

(65) Prior Publication Data
US 2019/0178702 A1    Jun. 13, 2019

(51) Int. Cl.
*G01G 19/08* (2006.01)
*G01G 9/00* (2006.01)
*G01G 3/16* (2006.01)

(52) U.S. Cl.
CPC ............. *G01G 19/086* (2013.01); *G01G 3/16* (2013.01); *G01G 9/00* (2013.01)

(58) Field of Classification Search
CPC .... G01G 19/086; G01G 19/08; G01G 19/022; G01G 19/042; G01G 9/00
See application file for complete search history.

(56) References Cited

U.S. PATENT DOCUMENTS

| | | | | |
|---|---|---|---|---|
| 4,588,038 A | * | 5/1986 | Takagi | G01G 23/163 177/141 |
| 4,916,632 A | * | 4/1990 | Doi | B60G 17/018 280/5.515 |
| 6,069,324 A | * | 5/2000 | Shimizu | G01G 19/12 177/136 |

(Continued)

FOREIGN PATENT DOCUMENTS

| | | |
|---|---|---|
| DE | 102011116195 A1 | 4/2013 |
| DE | 102015218547 A1 | 3/2017 |

(Continued)

OTHER PUBLICATIONS

English Translation of JP Patent No. 2011-0178673 (JP Application No. 2011-222122).*

(Continued)

*Primary Examiner* — Helen C Kwok
(74) *Attorney, Agent, or Firm* — Dean W. Russell; Kilpatrick Townsend & Stockton LLP

(57) ABSTRACT

A method for monitoring the mass of an object may include (i) applying a vibratory force to the object so that the object vibrates in whole or in part, (ii) providing a sensor or sensors configured to measure vibrations of the object in response to the force, (iii) measuring vibration data from the sensor or sensors, and (iv) comparing the vibration data or a parameter derived therefrom to reference data or one or more reference parameters, so as to determine the mass of the object or an indication that the mass of the object differs from that indicated by the reference data or one or more reference (Continued)

parameters. The object may, but need not necessarily, be a vehicle. The vibratory force may be provided by an integral vehicle component, for example a vehicle engine.

21 Claims, 3 Drawing Sheets

(56) References Cited

U.S. PATENT DOCUMENTS

| | | | | |
|---|---|---|---|---|
| 6,150,617 | A * | 11/2000 | Hart .................. | A01B 79/005 177/136 |
| 8,991,545 | B2 * | 3/2015 | Furst .................. | B60R 21/015 180/290 |
| 2003/0040885 | A1 * | 2/2003 | Schoess ............... | G01G 3/16 702/173 |
| 2009/0024336 | A1 * | 1/2009 | Tatom ................. | G01G 19/022 702/56 |
| 2010/0161254 | A1 | 6/2010 | Atlas et al. | |
| 2011/0178673 | A1 * | 7/2011 | Nakamura ............. | G01G 3/16 701/31.4 |
| 2012/0285750 | A1 * | 11/2012 | Hynes ................. | G01G 19/083 177/1 |
| 2012/0285752 | A1 * | 11/2012 | Sorimachi ............ | B60N 2/002 177/136 |
| 2013/0161110 | A1 * | 6/2013 | Furst .................. | A47C 31/126 180/273 |
| 2014/0297143 | A1 * | 10/2014 | Soderstrom ......... | F16H 61/0213 701/60 |
| 2016/0265960 | A1 * | 9/2016 | Watanabe ............. | G01G 19/08 |

FOREIGN PATENT DOCUMENTS

| | | |
|---|---|---|
| GB | 1123126 A | 8/1968 |
| JP | 2013083483 A | 5/2013 |
| WO | 2009055472 A1 | 4/2009 |

OTHER PUBLICATIONS

United Kingdom Patent Application No. GB1720339.9, Search Report dated Jun. 7, 2018, 5 pages.

* cited by examiner

METHOD AND SYSTEM FOR MONITORING THE MASS OF AN OBJECT

TECHNICAL FIELD OF THE INVENTION

The invention relates to a method and system for monitoring the mass of an object. More specifically, the invention relates to a method and system for monitoring the mass of an object, such as a vehicle, when subject to a vibratory force, for example the vibrations from a vehicle engine.

BACKGROUND TO THE INVENTION

In the field of mass measurement and monitoring, it can be particularly challenging to monitor the mass of large objects such as vehicles. Nevertheless, industries reliant upon the bulk movement of goods, such as the haulage industry, do need to measure and monitor the mass of vehicles and their cargoes. This may be needed for logistical or regulatory purposes, or may be needed for ancillary purposes such as security and border control.

It is known to use weighbridges to monitor the mass of both loaded and unloaded vehicles such as cars, vans and lorries. However, weighbridges are sometimes not convenient to use as they are often sited in a fixed location due to their size and construction. An individual weighbridge usually also has a maximum operating mass, which will in turn be dependent on its particular construction. Weighbridges typically require that the vehicle to be measured is manoeuvred into a particular position on the device.

SUMMARY OF THE INVENTION

In a first aspect of the invention, there is provided a method for monitoring the mass of an object, the method comprising the steps of:
  (i) applying a vibratory force to the object, so that the object vibrates in whole or in part;
  (ii) providing a sensor or sensors configured to measure the vibrations of the object in response to the applied force;
  (iii) measuring vibration data from the sensor(s); and
  (iv) comparing the vibration data or a parameter derived therefrom to reference data or one or more reference parameters, so as to determine the mass of the object or an indication that the mass of the object differs from that indicated by the reference data or one or more reference parameters.

The response of an object or part of an object to the application of a vibratory force is to oscillate, in time, about a fixed position, which can be measured as movement of the object about this fixed position (for example, using an accelerometer located on the object, or a vibration sensor located remote from the object). Although the vibrations induced by the force may be complex, the inventors have nevertheless found that vibration data, or a parameter derived therefrom, are measurably affected by any change in the mass of the object and hence, can be used to monitor mass changes over time or even derive mass values. In the invention, therefore, a method is provided which monitors the mass of an object by applying a vibrating force to the object, measuring corresponding vibrations in whole or part of the object using one or more sensors, and comparing the vibration data so obtained to reference data, so as to determine the mass of the object or an indication that the mass has changed. Alternatively, a parameter is derived from the vibration data (for example the frequency of vibration or a distribution value) and compared with one or more reference parameters.

Preferably, the vibratory force is a continuous force, typically, but not necessarily, for the duration of the measurement of vibration data. In some situations, however, the vibratory force may involve a single application of a force, or the application of a plurality of discrete vibratory forces. The force needs to be of sufficient magnitude to cause the object to vibrate in whole or in part.

The method of the invention may in principle be applied to any object, but preferably the object is a large object, for example an object having a mass in excess of 1 tonne. The method has particular application where the object is a vehicle, for example a car, a van, a lorry or even an aircraft. Vehicles are large objects which present particular challenges regarding mass measurement. By using the method of the invention, it is possible to measure the vehicle's mass without employing large scale weighing equipment such a weighbridge, and without needing to manoeuver the vehicle into a fixed position. Instead, in situ or remote sensor or sensors may be used to monitor the mass of the vehicle at any location.

The invention makes it possible to monitor the mass of the object, such as a vehicle, over a required period, to determine whether or not the mass of the object changes. Preferably, therefore, steps (iii) and (iv) of the method are repeated over time so as to determine whether the mass of the object changes over time. By monitoring for any change in the mass of a vehicle, it is possible to determine when a cargo has been loaded or unloaded. Alternatively, it is possible to determine whether or not there is an unregulated or undesirable surplus mass, such as may be the case for an overloaded freight vehicle. Other reasons to monitor mass over time will be apparent to the skilled person.

The method may further comprise the step of providing an alert or warning, such as, for example, an audio and/or visual alarm, so that an alarm can be raised when the comparison of the vibration data or parameter derived therefrom to reference data or one or more reference parameters indicates that a pre-determined mass has been reached or exceeded, or that the mass differs from an expected value.

The vibratory force may be provided by any suitable source of vibrations, which source may be located internal or external to the object. A source of vibrations may comprise any suitable arrangement in which the object is engaged with the vibratory source such that sufficient force is imparted on the object so as to cause it to vibrate in whole or in part. A source of vibrations may be permanently or temporarily attached to the object, or alternatively may be in contact with, but not directly attached to, the object. The skilled person will recognise that a source of vibrations may be attached, or removably attached, to the object, by way of any suitable fixing means such as, but not limited to, adhesive, rivets, bolts, fixing brackets or similar.

By way of example, an external vibratory force may be provided by an oscillating platform on or against which the object can be located. Alternatively, the vibratory force may comprise a rotating motor, such as an off centre rotating motor, which may be in contact with or fixed to the object. These are particularly advantageous where it is undesirable to locate a source of vibrations within the object itself.

Particular advantages arise if the vibratory force is applied by a source of vibrations that is integral to the object, more preferably integral to the object and itself a functional component of the object. This provides for a convenient means of applying an in situ vibratory force without the need to position a separate source of vibrations in, on or against the object.

In the case of a vehicle, the source of vibrations which provides the vibratory force is preferably the vehicle's engine, more preferably an idling engine. When running, vehicle engines cause the body of the vehicle to vibrate. This is the case even when the vehicle is otherwise stationary and the engine is idling. Therefore, vehicle engines provide a convenient, integral source of vibrations for monitoring the mass of a vehicle according to the invention, without the need for an additional oscillator which may compromise the normal functioning of the vehicle, or affect the forces experienced by passengers or cargo.

The method may comprise the step of determining that the object has substantially constant linear velocity before measuring the vibration data. More preferably, the method comprises the step of determining that the object is substantially at rest before measuring the vibration data, in other words the object is stationary with respect to translational motion. For example, a vehicle is at rest when it is not being driven. Suitably, the method is applied to a vehicle when it is parked with the engine running or idling.

Determining that the object is substantially at rest prior to and/or during the measurement of the vibration data ensures that the measured movement of the object is primarily as a result of the vibratory force. This may reduce errors in the measurement of the vibration data and hence, improve accuracy.

The step of determining that the body is substantially at rest may be undertaken using any suitable sensor(s), for example an accelerometer a laser, an optical imaging system, a Global Positioning System sensor, or any combination thereof. The sensor(s) may be located on or within the object, or located remotely, or both. The sensor or sensors used to measure the vibration data of the object, described in more detail below, may also be used to determine whether or not the object has substantially constant linear velocity, or is substantially at rest. This reduces the complexity of the system.

Any suitable sensor or sensors may be used to measure the vibrations of the object in response to the applied vibratory force. For example, the sensor may be an accelerometer, a laser, or an optical imaging system, or any combination thereof. The sensor or sensors may be located on or within the object, or arranged remotely from the object, or both.

An accelerometer is a preferred choice for locating the sensor or sensors on or within the object, because an accelerometer is a readily available, simple, cheap and convenient means of measuring the vibration data.

Lasers are a suitable choice for remote vibration detection. A laser-based sensor or sensors may be directed at the object so that vibration data such as velocity, displacement and/or acceleration of the object or part of the object over time may be measured. Alternatively, the vibration data may be measured remotely using an optical imaging system, which can be used to record changes in position of the object over time. Remote measurement provides the advantage that the mass of the object can be monitored without the need for a sensor to be located on the object itself. Such remote sensors could be located in a fixed position, or alternatively could be movable to enable them to be re-positioned relative to the location of the object.

Preferably, a plurality of sensors is used. The plurality of sensors may be used to monitor simultaneously the vibration data, which provides the opportunity to check the measured response, as well as the ability to determine an average response from the sensors; this reduces errors and improves accuracy. Alternatively, or in addition, the plurality of sensors may be used to monitor different parts of the object which may have different vibration responses.

The measured vibration data preferably comprises displacement, time, velocity or acceleration values, or any combination thereof.

It will be apparent to those skilled in the art that the time period over which the vibration data are measured may be optimised depending on, for example, the derived parameter, or nature of the object, or the magnitude and duration of vibratory force, or any combination thereof. In many applications, it may be possible for vibration data to be measured over a plurality of periods of oscillation. Measuring the vibration data for more than one period of oscillation enables the parameter associated with the vibration data to be derived from information associated with more than one period. This may improve the accuracy of the derived parameter because any anomalous readings or noise associated with the vibration data can be discarded or reduced. In one example of a stationary car vibrating due to the integral drive motor at idle, the inventors identified a fundamental vibrational mode in the range 10-60 Hz. As a result, it was possible to measure vibrational data corresponding to approximately 200-1200 oscillatory periods in a measurement time of 20 seconds.

The vibration data may be measured in one, two or three dimensions as appropriate. If the vibration data are measured in two or three dimensions, the parameter derived from the vibration data may be calculated from the resultant of the measured response. For example, in the case of three dimensions, the at least one parameter may be calculated from the route mean square of the measured vibration data in the direction of a first, second and third orthogonal axis.

The method of the invention can be used to determine the mass of the object, or obtain an indication that the mass of the object deviates from a reference value. This is achieved by comparing the vibration data, or a parameter derived therefrom, to reference data or one or more reference parameters.

The reference data, or parameter derived therefrom, are chosen to be data or a parameter related to the mass of the object, and known to change as the mass of the object changes.

The step of comparing the derived parameter to the one or more reference parameters may comprise determining if the derived parameter is greater than, less than or matches the reference parameter(s). Where the derived parameter and the reference parameter(s) match, the object can be determined to be at the mass corresponding to the reference parameter(s). Where the parameter differs from the reference parameter(s) the object can be determined to have a different mass than that indicated by the reference parameter(s). Optionally, the reference parameter(s) may further comprise an indication of whether an increase or decrease in the variable type of the reference parameter(s) relates to an increase or decrease in the mass of the object. This enables an indication of an increase or a decrease in mass to be determined from the step of comparing the derived parameter to the reference parameter(s).

The one or more reference parameters may comprise single value or a series of values, for example a series of calibration values for different mass loadings for the object, or a look up table. Alternatively, the reference parameter may comprise a relationship, such as a linear relationship or a calibration curve, describing the relationship between the derived parameter and the mass of the object. Having a reference parameter comprising a scale and/or a relationship enables the mass of the object to be determined by comparing the parameter to the reference parameter(s) and deriving the associated mass. In the case where the reference parameter(s) is a series of calibration values for different mass loadings, the interval between different values can be optimally selected depending of the required level of accuracy required. For example, where an approximate determination of mass of the object is sufficient, the scale may have relatively larger intervals between values than cases where a high degree of fidelity is desirable.

The reference parameter(s) may be derived in a calibration step prior to implementing the method, for example by measuring vibration data for an object or objects of known mass or masses when subjected to a known vibratory force or forces.

The derived parameter may be the vibration frequency, for example a frequency derived from displacement/time data captured using one or more accelerometers. For a given vibratory force, the frequency of oscillation of an object will change in relation the addition or removal of mass. As mass is added, the frequency of oscillation will typically decrease. In contrast, as the mass decreases, the frequency of oscillation will increase. Therefore, by deriving the frequency of oscillation from the vibration data of the object and comparing this to a reference frequency value for a known mass, it is possible either to determine the mass of the object or establish whether the mass of the object has increased or decreased relative to the mass indicated by the reference value.

The derived frequency may be compared to a reference parameter that is a single reference frequency relating to a specific object mass, for example a known oscillation frequency for an unloaded vehicle at rest, in which case it is possible to determine whether or not the mass of the vehicle matches the reference, or differs from the reference. Alternatively, the reference parameter may be a series of frequencies associated with a range of different object mass values, for example calibration frequencies for a vehicle having various mass loadings, in which case it is possible to determine the mass of the object.

Alternatively, the derived parameter may be a distribution value derived by applying a distribution function to the vibration data. The distribution value may be a measure of the spatial distribution, or spread, of the vibration data of the object. Advantageously, the measured vibration data comprises at least two of time, displacement, velocity and acceleration and the distribution value is derived by applying a distribution function to at least two of these variables. For example, the distribution value may be a time-dependant spatial distribution measure. More preferably, the distribution value is obtained from two of velocity, displacement and acceleration.

The inventor has found that, when the vibration data are repeatedly sampled as a plurality of values over time, applying a distribution function can be used to determine the mass, or a change in the mass, of an object. This is because the relative spread, or the amount of relative separation, of the values changes with mass loading, as illustrated below with regard to FIGS. 2a and 2b. The vibration data may be measured as a plurality of samples of two or more variables. Each sample comprises the value of each variable taken at a specific point in time or a specific position of the object. Optionally, the samples may be taken at regular time intervals.

For example, a set of displacement and velocity measurements may be taken at pre-determined time intervals. In the example of displacement and velocity measurements, the inventor has found that the lower the relative spread of the plurality of displacement and velocity measurements, the greater the mass of the object. Alternative combinations of variables from which a distribution can be derived will be apparent to those skilled in the art, such as, but not limited to, the combination of displacement and acceleration.

The distribution function may be a measure of deviation, for example standard deviation. Standard deviation is a convenient means of measuring the spread of vibration data, and provides an indication of the extent to which the sampled values of the vibration data differ from the mean value of the sampled vibration data.

More preferably, however, the distribution function is a correlation function, for example a linear correlation function. Correlation functions provide a statistical measure for determining correlation between two or more variables. For example, linear correlation functions may be used to measure the linear association between at least two variables. Advantageously, the linear correlation function is the Pearson Correlation function. Suitably, the correlation function is applied to velocity/displacement values.

In a second aspect of the invention, there is provided a system for monitoring the mass of an object, the system comprising an object, a source of vibrations for applying a vibratory force to said object in whole or in part, a sensor or sensors configured to measure vibrations of the object in response to the force in at least a first dimension, and a processor configured to compare the vibration data or a parameter derived therefrom to reference data or one or more reference parameters, so as to determine the mass of the object or an indication that the mass of the object differs from that indicated by the one or more reference parameters.

The processor is configured to implement the method described in relation to the first aspect. Any suitable processor may be used.

The sensor or sensors may be positioned at any suitable location, for example inside the object or on the surface of the object. The sensor or sensors may be arranged to transmit data to the processor by means of a wired or a wireless connection.

Any suitable sensor or sensors may be used, such as, for example, an accelerometer, a laser, or an optical imaging system, or any combination thereof. An accelerometer is especially suited to being fixed, removably or otherwise, onto or within the object.

Alternatively, the sensor or sensors may be located remote from the object, so that the vibration data can be measured without the need to locate a sensor on or within the object. This can reduce costs as only a single sensor may be needed to monitor multiple vehicles. It is also advantageous because it is possible to monitor the mass of the object without the need to install a sensor onto or within the object. For example, lasers and optical imaging systems are particularly suited to the remote measurement of the vibration data of the object.

The system may comprise a plurality of sensors configured to simultaneously measure the vibration data of the object, for example both an accelerometer and a laser may be used to monitor the object or, by way of alternative example, a laser and an optical imaging may be used in conjunction with one other to measure the vibration data of the object.

Optionally, the system comprises a sensor for determining whether or not the object has substantially constant linear velocity. More preferably, the system comprises a sensor for determining whether or not the object is substantially at rest.

The sensor may be an accelerometer, a laser, an optical imaging system, or a Global Positioning System sensor, or a combination thereof.

The object may be a vehicle, for example a road vehicle such as car, a van, a lorry, or an aircraft.

The source of vibrations may be an internal or external source. An internal source may be integral to the object. Although the source may be incorporated into the object for the specific purpose of providing a vibratory force, it is more convenient to use a source which is also a functional component of the object. For example, in the case where the object is a vehicle, the vibratory force may be applied by the vehicle engine, more preferably an idling engine. The vehicle engine may be responsible for both powering the drive mechanism of the vehicle as well as providing the vibratory force.

In a third aspect, there is provided the use of a vehicle engine as a source of vibrations in a method to determine the mass, or change in mass, of said vehicle.

In a fourth aspect, there is provided a method for calibrating the vibration response of an object, said method comprising the steps of:
  a. applying a vibratory force to an object of known mass so that the object vibrates in whole or in part;
  b. providing a sensor or sensors configured to measure vibrations of the object in response to the force;
  c. optionally applying an additional known load mass to the object;
  d. measuring vibration data from the sensor(s) and optionally deriving a one or more parameters therefrom.

Step c) need not be carried out where it is desired to calibrate the object when unloaded. The load mass may be located at any suitable position on the object.

For example, the load mass may be located within a cargo hold of a lorry or the storage compartment of a car. For a car the load mass may have a mass in the range 10 kg to 200 kg.

Preferably, steps c) and d) are repeated to obtain a desired range of calibration values.

The object may be a vehicle and the vibratory force may be applied by the vehicle engine.

Any feature in one aspect of the invention may be applied to any other aspects of the invention, in any appropriate combination. In particular system and use aspects may be applied to method aspects and vice versa.

BRIEF DESCRIPTION OF THE DRAWINGS

The invention will now be described, purely by way of example, with reference to the accompanying drawings, in which.

The schematic drawings are for illustrative purposes only and are not to scale.

DETAILED DESCRIPTION

Figure 1A:
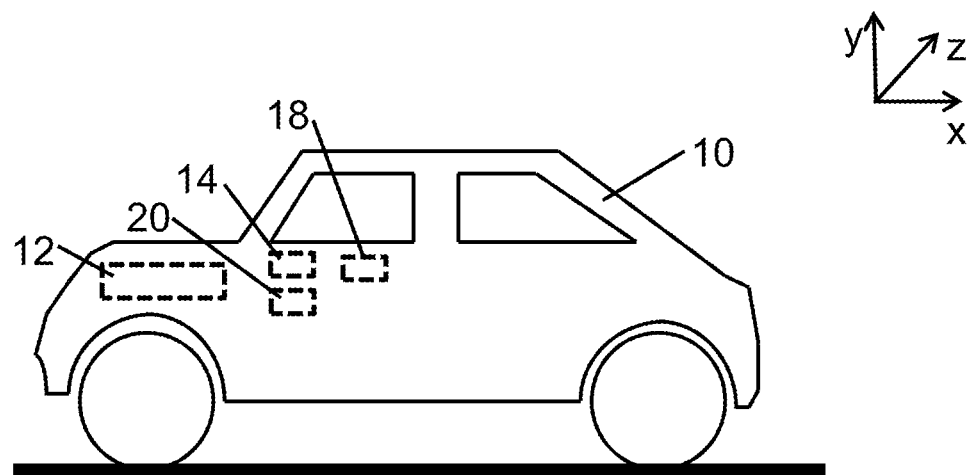
FIGS. 1a and 1b are schematic side views of an unloaded and loaded vehicle (respectively) illustrating the method of the invention.

FIG. 1a schematically shows an object which is a vehicle 10. An accelerometer 14 is fixed within vehicle 10 using any suitable means. As the engine 12 of vehicle 10 runs at idle, it causes the vehicle 10 to vibrate in three dimensions x, y, z. The vehicle 10 is stationary with regard to linear motion, as indicated by the GPS location sensor 18.

The accelerometer 14 is used to measure the vibration of the vehicle 10 in response to idling engine 12 in an x, y and z direction in terms of both displacement and time. The frequency of the oscillation is then derived from the displacement and time measurements. The frequency of oscillation is used as a reference parameter.

Figure 1B:
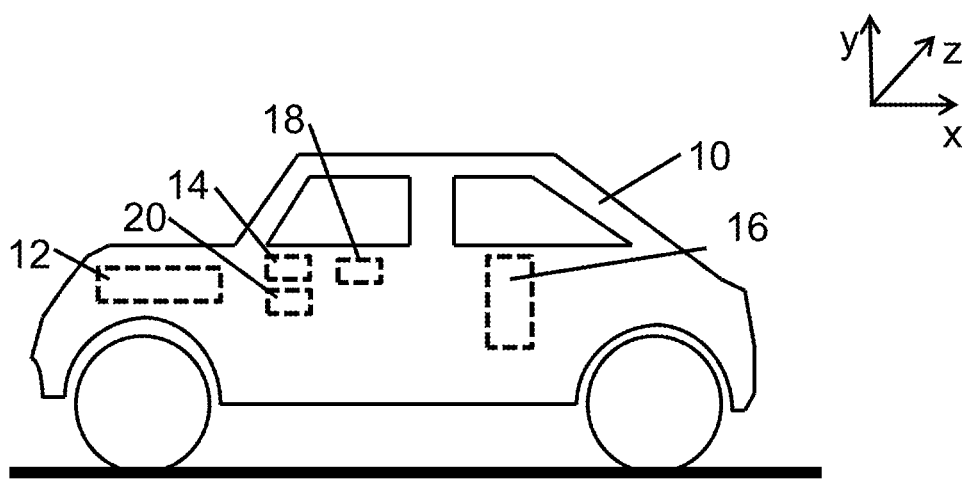

In FIG. 1b, the vehicle 10 is loaded with a mass 16 located on the rear seat of the vehicle. This causes the vibration of the vehicle 10 in response to the idling engine 12 to change. A second frequency of oscillation of the loaded vehicle 10 is then derived from the displacement and time measurements measured by accelerometer 14.

When the frequency of oscillation of the vehicle 10 with additional mass 16 is compared, for example using a processor 20, with the reference value of the frequency of oscillation of the unloaded vehicle 10, they will not match indicating that the mass of loaded vehicle 10 differs from that of the unloaded vehicle 10.

Figure 2A:
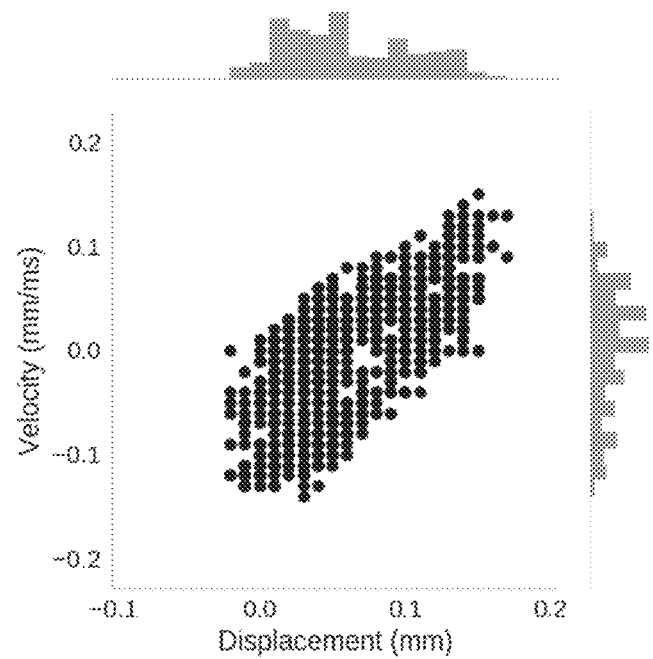
FIGS. 2a and 2b are plots showing a plurality of displacement versus velocity values for (respectively) an unloaded and a loaded vehicle.

The method of the invention has been used to monitor the mass of a vehicle when loaded with different masses. An Adafruit LIS3DH® Triple-Axis Accelerometer was fixed to the dashboard of a Ford Fiesta® passenger vehicle. The accelerometer was used to measure a plurality of displacement and velocity values over a period of 20 seconds, while the 1.0 litre petrol engine was idling and the vehicle was unloaded. The values were measured in an x, y and z direction and the resultant root mean square values of displacement and velocity were calculated using processor 20. FIG. 2a shows a plot of the resultant displacement versus resultant velocity values of the vehicle before it was loaded.

Figure 2B:
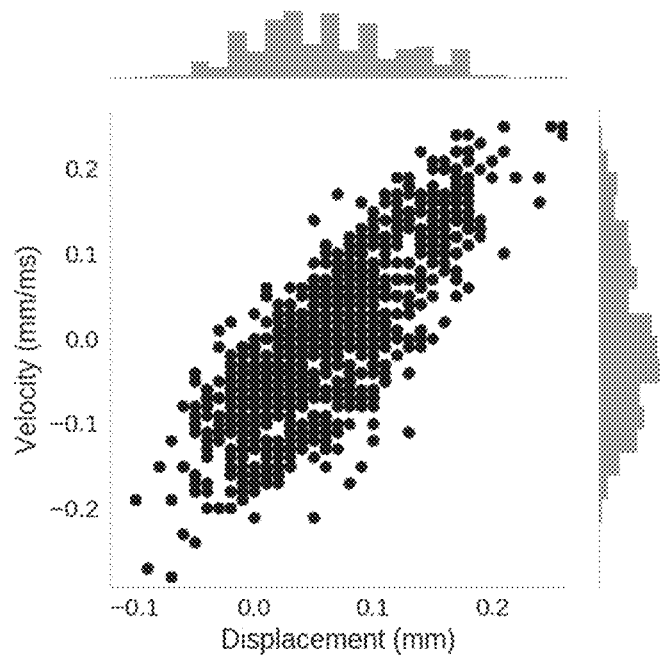

A first mass of 50 kg was positioned on the rear seat of the vehicle, and the accelerometer readings were repeated. FIG. 2b shows the corresponding plot of the resultant displacement and resultant velocity values for the loaded vehicle.

It can be seen by comparing the plots of FIGS. 2a and 2b that the distribution of the displacement and velocity values is different for the vehicle when unloaded (FIG. 2a) than for the vehicle when loaded with a 50 kg mass (FIG. 2b). Thus, the distribution of the displacement and velocity values is affected by the change in loading of the vehicle. The relationship between the change of mass of the vehicle and the relative change of the velocity displacement values is also indicated by the Pearson Ratio, which changes from −0.69 for the unloaded vehicle to −0.8 for the vehicle when loaded with a 50 kg mass.

The experiment was repeated for second and third masses of 100 kg and 150 kg respectively located on the rear seat of the vehicle. Depending on the loading of the vehicle, vibration data were recorded over approximately 200 to 1200 periods of oscillation.

The Pearson Correlation function was separately applied to each of the plurality of displacement and velocity datasets resulting in a Pearson Ratio for the vehicle when unloaded, and when carrying each of the first, second and third masses.

Figure 3:
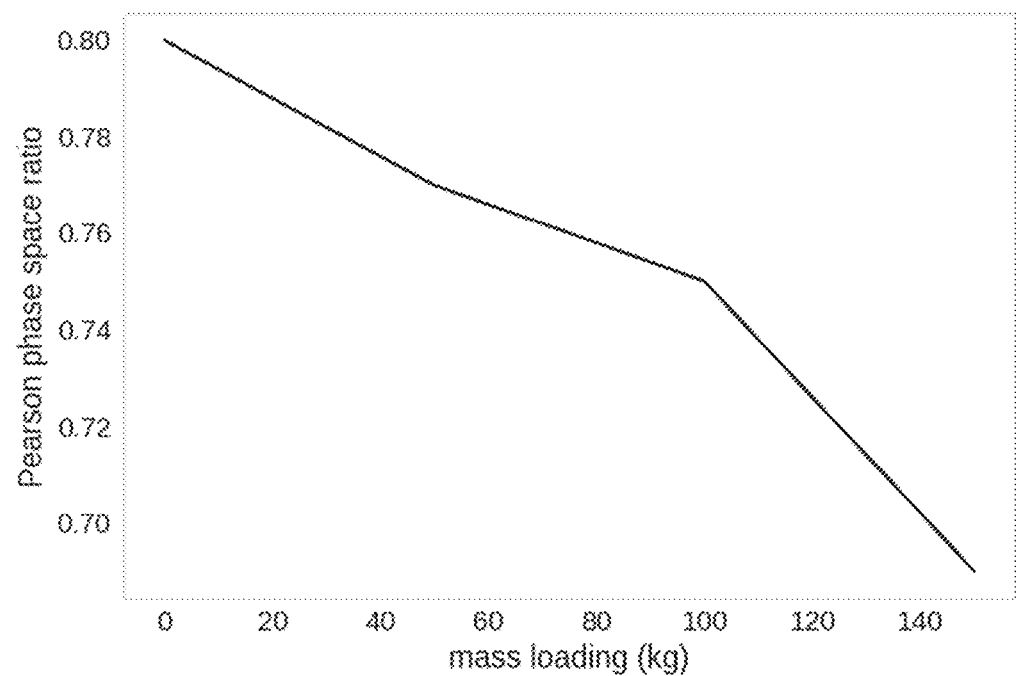
FIG. 3 is a plot of the Pearson Ratio versus load mass, derived from displacement and velocity values such as those illustrated in FIGS. 2a and 2b.

FIG. 3 shows a plot of the Pearson Ratio against vehicle mass for a vehicle when unloaded and when loaded with 50 kg, 100 kg and 150 kg of additional mass. Analysis of FIG. 3 shows a relationship between vehicle load mass and the derived Pearson Ratio. Therefore, the Pearson Ratio can act as a suitable reference parameter for deriving the mass of an object, for example the mass of a vehicle, or for determining whether the mass has changed.

It will be understood that the present invention has been described above purely by way of example, and modification of detail can be made within the scope of the invention. Each feature disclosed in the description, and (where appropriate) the claims and drawings may be provided independently or in any appropriate combination.

Moreover, the invention has been described with specific reference to monitoring the mass of vehicles, for example in the transportation and haulage industry. It will be understood that this is not intended to be limiting and the invention may be used more generally to measure or monitor the mass of objects. For example, the invention may be used in fields such as security or space. Additional applications of the invention will occur to the skilled person.

The invention claimed is:

1. A method for monitoring a mass of an object, the method comprising the steps of:
   (i) applying a vibratory force to the object, so that the object vibrates in whole or in part,
   (ii) providing a sensor or sensors configured to measure vibrations of the object in response to the force,
   (iii) measuring vibration data from the sensor or sensors, and
   (iv) comparing a parameter derived from the vibration data to reference data or one or more reference parameters, so as to determine the mass of the object or an indication that the mass of the object differs from that indicated by the reference data or one or more reference parameters, wherein the parameter derived from the vibration data is a distribution value obtained by applying a distribution function to the vibration data and wherein the distribution value is a measure of a spatial distribution of the vibration data of the object.

2. A method according to claim 1, wherein steps (iii) and (iv) are repeated over time so as to determine whether or not the mass of the object changes over time.

3. A method according to claim 1, wherein the measured vibration data comprises displacement, time, velocity or acceleration, or any combination thereof.

4. A method according to claim 1, wherein the derived parameter is a frequency of oscillation.

5. A method according to claim 1, wherein the distribution value is obtained from two of velocity, displacement and acceleration.

6. A method according to claim 1, wherein the distribution function is a measure of deviation.

7. A method according to claim 1, wherein the distribution function is a correlation function.

8. A method according to claim 7, wherein the correlation function is the Pearson Correlation function.

9. A method according to claim 1, wherein the sensor or sensors are an accelerometer, a laser, or an optical imaging system, or any combination thereof.

10. A method according to claim 1, wherein the sensor or sensors are arranged remotely from the object.

11. A method according to claim 1, wherein the sensor or sensors are located on the object.

12. A method according to claim 1, wherein the object is a vehicle.

13. A method according to claim 1, wherein the vibratory force is applied by a source of vibrations that is integral to the object.

14. A method according to claim 13, wherein the vibratory force is applied by a vehicle engine.

15. A method according to claim 1, further comprising the step of (v) determining that the object is substantially at rest before measuring the vibration data.

16. A system for monitoring a mass of an object, the system comprising a source of vibrations for applying a vibratory force to said object in whole or in part, a sensor or sensors configured to measure vibration data of the object in response to the force, and a processor configured to compare a parameter derived from the vibration data to reference data or one or more reference parameters, so as to determine the mass of the object or an indication that the mass of the object differs from that indicated by the one or more reference parameters, wherein the parameter derived from the vibration data is a distribution value obtained by applying a distribution function to the vibration data and wherein the distribution value is a measure of a spatial distribution of the vibration data of the object.

17. A system according to claim 16, wherein the sensor or sensors are an accelerometer, a laser, or an optical imaging system, or any combination thereof.

18. A system according to claim 16, wherein the system comprises a sensor for determining whether or not the object is substantially at rest.

19. A system according to claim 16, wherein the object is a vehicle.

20. A system according to claim 16, wherein the source of vibrations is a source integral to the object.

21. A system according to claim 20, wherein the source is a vehicle engine.

* * * * *